United States Patent
Zwanenburg

(12) 
(10) Patent No.: US 6,749,744 B1
(45) Date of Patent: Jun. 15, 2004

(54) DEVICE FOR REGENERATING AN ION EXCHANGE CARTRIDGE

(75) Inventor: Godwin Dirk Zwanenburg, Hoogeveen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/678,457

(22) Filed: Oct. 3, 2000

(30) Foreign Application Priority Data

Oct. 5, 1999 (EP) .............................. 99203248

(51) Int. Cl.⁷ ............................................... B01J 49/00
(52) U.S. Cl. ...................... 210/136; 210/190; 210/269; 210/282
(58) Field of Search ................................ 210/136, 190, 210/191, 269, 282

(56) References Cited

U.S. PATENT DOCUMENTS

| | | | | |
|---|---|---|---|---|
| 1,354,604 A | * | 10/1920 | Duggan | 210/191 |
| 2,006,287 A | * | 6/1935 | Wilbanks | 210/190 |
| 2,278,488 A | * | 4/1942 | Ralston | 210/282 |
| 2,832,373 A | * | 4/1958 | Scholer | 210/190 |
| 3,831,754 A | * | 8/1974 | Heskett | 210/282 |
| 4,026,801 A | * | 5/1977 | Ward | 210/190 |
| 4,090,963 A | * | 5/1978 | Grout | 210/190 |
| 4,336,134 A | * | 6/1982 | Prior | 210/190 |
| 5,589,058 A | * | 12/1996 | Bauer | 210/191 |

FOREIGN PATENT DOCUMENTS

| | | | |
|---|---|---|---|
| EP | 0041929 A1 | 5/1981 | B01J/49/00 |
| EP | 0621239 A2 | 3/1994 | C02F/1/42 |

* cited by examiner

Primary Examiner—Ivars C. Cintins
(74) Attorney, Agent, or Firm—Ernestine C. Bartlett

(57) ABSTRACT

The invention relates to a device for regenerating an ion exchange cartridge. In household appliances with an electric heating element for heating water, such as irons, coffee makers, and electric water kettles, deposition of scale is prevented by using an ion exchange cartridge (16) comprising a resin (23) which binds alkaline earth metal ions such as $Ca^{2+}$ and $Mg^{2+}$, but also negative ions such as $SO_4^{2-}$ and $CO_3^{2-}$ ions. The device is a simple tool in which the cartridge can be inserted for regeneration. The device comprises a reservoir (2) with an outlet (10) to which an inlet (6) of the cartridge can be coupled. By filling the reservoir with a brine, for example 1 l of water with 10% by weight of NaCl, said brine will flow through the cartridge replacing the alkaline earth metal ions, carbonate ions, and sulfate ions in the resin with the alkali metal ions ($Na^+$) and the chloride ions ($Cl^-$) of the brine. The brine can be easily drained into a sink.

6 Claims, 3 Drawing Sheets

DEVICE FOR REGENERATING AN ION EXCHANGE CARTRIDGE

BACKGROUND OF THE INVENTION

The invention relates to a device for regenerating an ion exchange cartridge which is provided with an inlet and an outlet.

Tap water is heated in domestic appliances such as steam irons, coffee makers and electric kettles. A quantity of $CaCO_3$ and $MgCO_3$ is deposited in the heating process, depending on the hardness of the water. The deposit thus formed is referred to as scale. A scale deposit gives rise to inter alia an impaired heat transfer and choking-up of water duct systems, and in the end to a premature failure of the domestic appliance. To counteract scale depositions, it is known, for example in electric irons, to use so-called anti-scale cassettes or cartridges. Such cartridges usually contain a resin which binds the alkaline earth metal ions among them $Ca^{2+}$ and $Mg^{2+}$, but also, for example, $CO_3^{2-}$, when coming in to contact with the water, so that no scale is formed. These cartridges are to be replaced with fresh cartridges from time to time, depending on the hardness of the water.

SUMMARY OF THE INVENTION

It is an object of the invention to provide a device with which the user of the domestic appliance him/herself can regenerate the cassette or cartridge in a simple manner, i.e. with which the alkaline earth metal ions can be removed from the cartridge, so that the cartridge can be re-used and need not be discarded.

The device according to the invention is for this purpose characterized in that the device is provided with a reservoir for the accommodation of a solution in which alkali metal ions and chloride ions are present, which reservoir is provided with an outlet to which the inlet of the ion exchange cartridge can be connected. The user takes the ion exchange cartridge from the domestic appliance and connects it with its inlet to the outlet of the reservoir of the regeneration device. Then the reservoir is filled with a solution in which alkali metal ions and chloride ions are present. After the reservoir has been filled, the solution (or brine) flows into the ion exchange cartridge, with the result that the alkaline earth metal ions from the resin of the ion exchange cartridge are replaced by the alkali metal ions of the solution. Such a solution may consist, for example, of water in which a quantity of ordinary salt (NaCl) has been dissolved. The required quantity of salt, equal to the product of the volume (L) and the concentration (g/L), must be sufficient. This obviously depends on the size of the cartridge. The solution flowing from the cartridge and the reservoir may be caught, for example, in a kitchen sink. The regeneration device is a comparatively simple tool by means of which a user him/herself can make the cartridge ready for use again. Any (bi)carbonate and sulfate (possibly sulfite) ions present in the ion exchange cartridge, such as $CO_3^{2-}$ or $HCO_3^-$ and $SO_4^{2-}$ or $SO_3^{2-}$, are exchanged with the $Cl^-$ ions from the salt solution at the same time. It may be noted that the regeneration process is known per se from industrial applications.

A preferred embodiment of the device is characterized in that the device is provided with a chamber in which the ion exchange cartridge can be placed, which chamber is provided with an inlet and an outlet, said inlet of the chamber being connected to the outlet of the reservoir, while said inlet and outlet of the chamber are coupled to the inlet and outlet, respectively, of the cartridge when a cartridge is inserted. The chamber facilitates the placement of the cartridge in the device.

A further preferred embodiment of the device is characterized in that a restriction is present in the flow path of the solution situated between the outlet of the reservoir and the outlet of the chamber. The flow velocity of the solution through the cartridge can be adjusted thereby such that an optimum regeneration rate is obtained. The restriction may be, for example, a spring-loaded non-return valve.

A yet further embodiment is characterized in that the outlet of the reservoir lies at a higher level than the outlet of the chamber in the operational condition of the device. The reservoir will empty itself completely under the influence of the hydrostatic pressure.

In yet another embodiment, a filter is present in the flow path of the solution situated between the outlet of the reservoir and the inlet of the chamber. This prevents any impurities, which could adversely affect the operation of the ion exchange cartridge, from entering this cartridge.

BRIEF DESCRIPTION OF THE DRAWINGS

The invention will now be explained in more detail below with reference to an embodiment shown in a drawing, in which.

DESCRIPTION OF THE PREFERRED EMBODIMENTS

Figure 1:
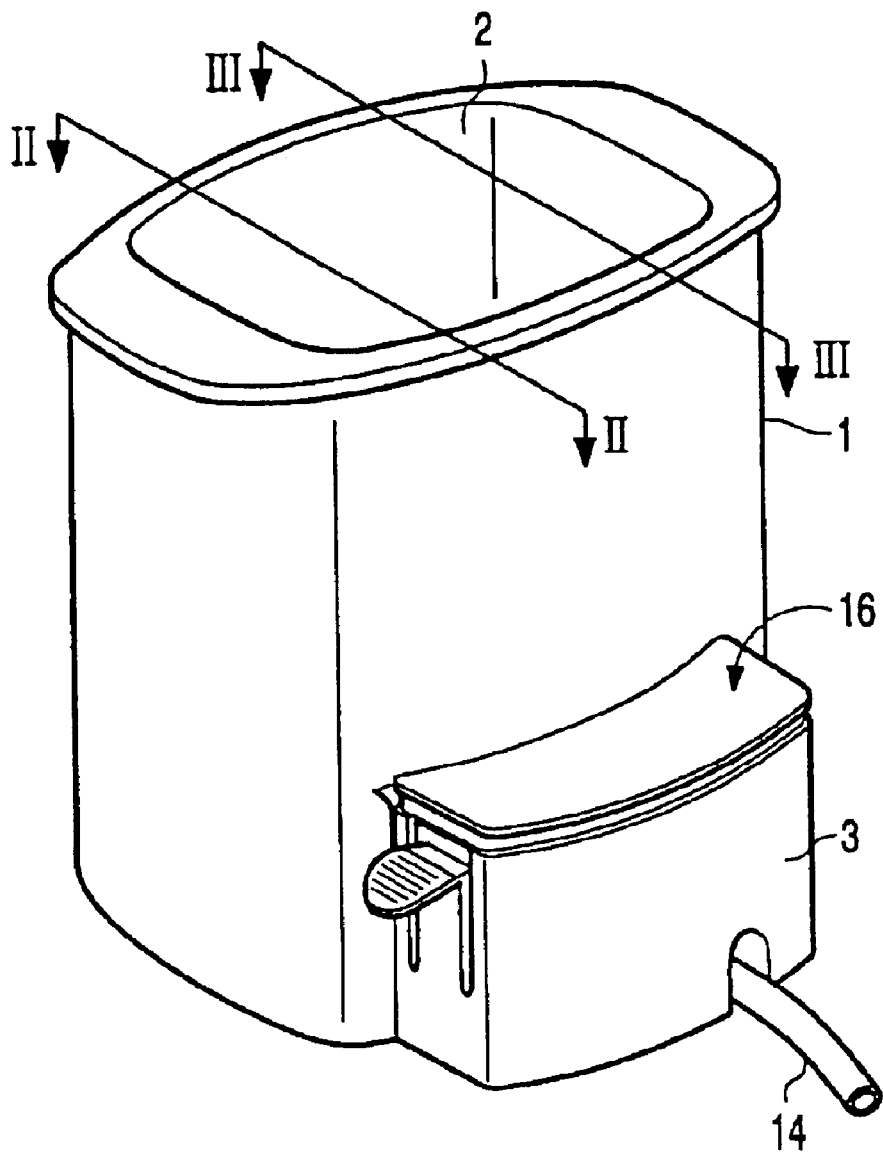
FIG. 1 is a perspective view of the device according to the invention.
Figure 2:
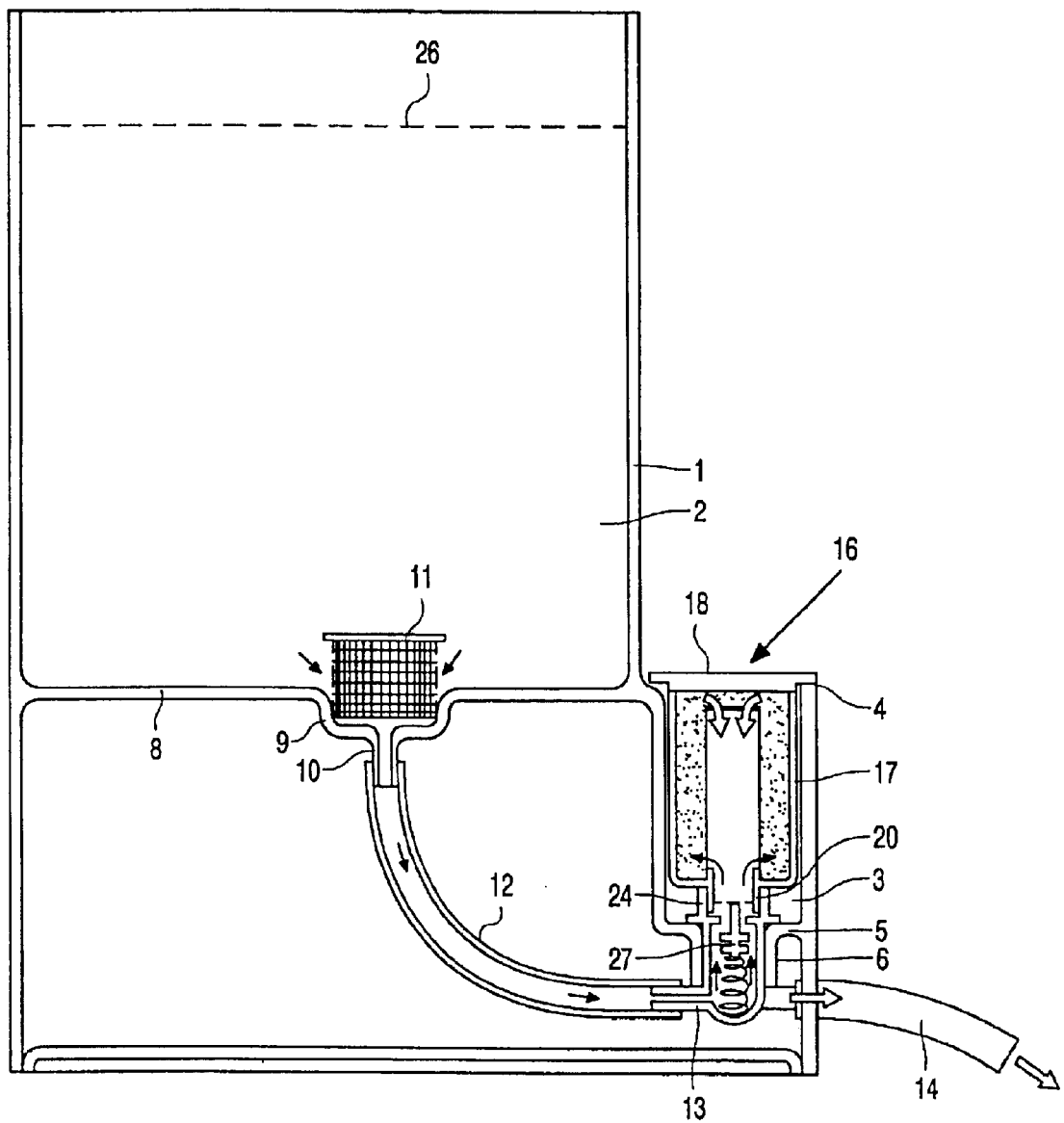
FIG. 2 is a cross-section taken on the line II—II of the device of FIG. 1.
Figure 3:
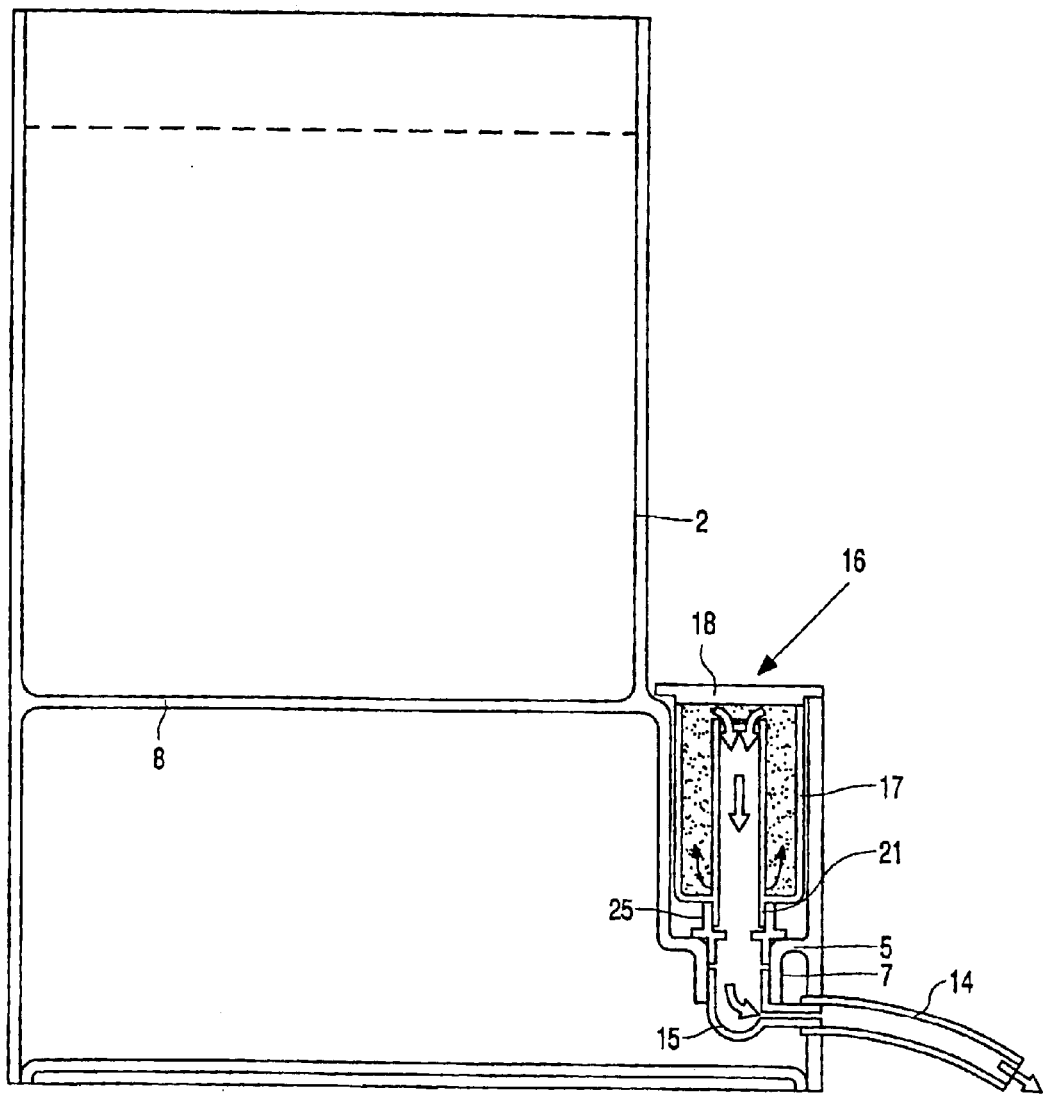
FIG. 3 is a cross-section taken on the line III—III of the device of FIG. 1.
Figure 4:
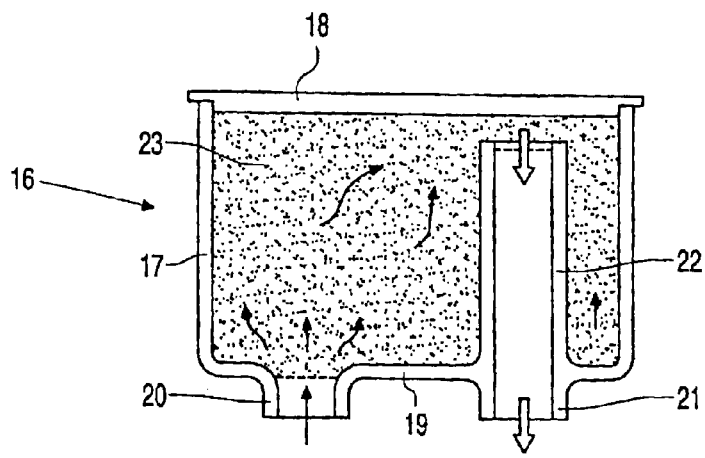
FIG. 4 is a cross-sectional view of the ion exchange cartridge.

As is apparent from the Figures, the regeneration device comprises a housing 1 which is substantially formed by a reservoir 2. The housing further has a chamber 3 whose upper side 4 is open. The bottom 5 of the chamber has an inlet 6 (FIG. 2) and an outlet 7 (FIG. 3). The bottom 8 of the reservoir 2 has a recessed portion 9 in which an outlet 10 is present. A filter 11 may be provided in the recessed portion 9. The outlet 10 is connected to the inlet 6 of the chamber 3, for example by means of a connecting tube 12, if necessary by means of a coupling piece 13. The outlet 7 of the chamber 3 may be provided with a discharge tube 14, possibly by means of a coupling piece 15. An ion-exchange cartridge 16 has a housing 17 which is closed by a cover 18 at its upper side. The bottom 19 (see FIG. 4) of the housing 17 is provided with an inlet 20 and an outlet 21. The outlet 21 has a pipe 22 which stands up vertically in the housing 17 to just under the cover 18. The cartridge contains a resin 23. The ion exchange cartridge 16 can be placed in the chamber 3 of the device, such that the inlet 20 and the outlet 21 of the cartridge automatically connect to the inlet 6 and the outlet 7, respectively, of the chamber 3, possibly with the aid of respective sealing rings 24 and 25.

The operation of the regeneration device is explained below. When the ion exchange cartridge 16 appears to be saturated, i.e. the resin has absorbed so many alkaline earth metal ions that the water in the domestic appliance can no longer be adequately descaled, the cartridge is taken from the domestic appliance and placed in the chamber 3 of the regeneration device. The device is placed near the edge of the kitchen sink such that the discharge tube 14 is suspended in the sink. The reservoir 2 is then filled with ordinary tap water in which a quantity of kitchen salt (NaCl) has been dissolved. One liter of water with 10% by weight of NaCl is sufficient for most cartridges. The salt solution 26 will flow from the reservoir 2 through the filter 11 and the tube 12 to the resin 23 in the cartridge 16, and from there through the discharge tube 14 into the sink under the influence of gravity. The alkaline earth metal ions such as $Ca^{2+}$ and $Mg^{2+}$ ions, are replaced with $Na^+$ ions from the salt solution in the resin. At the same time, the $CO_3^{2-}$ ($HCO_3$) and $SO_4^{2-}$ ($SO_3^{2-}$) ions are replaced with $Cl^-$ ions from the salt solution. After the cartridge has been flushed with the salt solution, it can be returned to the domestic appliance again (for example, an electric iron). The flow of the salt solution may be limited, or possibly controlled, by a restriction, for example a spring-loaded valve 27. A filter 11 at the outlet 10 of the reservoir 2 prevents any impurities from entering the cartridge 16. The outlet 10 of the reservoir 2 lies at a higher level than the outlet 7 of the chamber 3. The result of this is that the entire contents of the reservoir 2 will flow through the cartridge under the influence of the hydrostatic pressure. The pipe 22 in the cartridge 16 ensures that all resin 23 in the cartridge is effectively flushed with the salt solution 26.

What is claimed is:

1. In combination, an ion exchange resin cartridge (16) provided with an inlet (20) and an outlet (21), and a device for regenerating the cartridge, characterized in that the device is provided with a reservoir (2) for accommodating a solution (26), in which alkali metal ions and chloride ions are present, said reservoir (2) is provided with an outlet (10) to which an inlet (20) of the cartridge (16) is connected, a chamber (3) in which the cartridge (16) is located, provided in the device, said chamber (3) provided with an inlet (6) and an outlet (7), the inlet (6)) of the chamber (3) being directly connected to the outlet (10) of the reservoir (2), the inlet (6) and the outlet (7) of the chamber (3) being coupled to the inlet (20) and the outlet (21) respectively of the cartridge (16) and restriction (27) placed in the flow path of the solution situated between the outlet (10) of the reservoir (2) and the outlet (7) of the chamber (3).

2. A device as claimed on claim 1, characterized in that the restriction (27) is present in the inlet (6) of the chamber (3).

3. A device as claimed in claim 1 characterized in that the restriction (27) is provided with a spring-loaded non-return valve.

4. A device as claimed in claim 1 characterized in that the outlet (10) of the reservoir (2) lies at a higher level than the outlet (7) of the chamber (3) in the operational condition of the device.

5. A device as claimed in claim 1 characterized in that the outlet (7) of the chamber (3) is provided with a discharge tube (14).

6. A device as claimed in claim 1, characterized in that a filter (11) is present in the flow path upstream of outlet (10) of reservoir (2).

* * * * *